(12) United States Patent
Chen et al.

(10) Patent No.: US 8,418,582 B2
(45) Date of Patent: Apr. 16, 2013

(54) FLYWHEEL ASSEMBLY FOR EXERCISE DEVICES

(75) Inventors: Ming Nan Chen, Changhua County (TW); Yong Yuan Chen, Changhua County (TW)

(73) Assignee: Michael Lin, Taipei (TW)

( * ) Notice: Subject to any disclaimer, the term of this patent is extended or adjusted under 35 U.S.C. 154(b) by 129 days.

(21) Appl. No.: 13/042,455

(22) Filed: Mar. 7, 2011

(65) Prior Publication Data
US 2012/0227537 A1    Sep. 13, 2012

(51) Int. Cl.
*F16F 15/30*   (2006.01)

(52) U.S. Cl.
USPC ............................................. 74/574.1

(58) Field of Classification Search ........... 74/445, 74/572.2, 574.1, 574.2; 482/64, 99; 310/46, 310/74, 153
See application file for complete search history.

(56) References Cited

U.S. PATENT DOCUMENTS

| | | | | |
|---|---|---|---|---|
| 5,860,941 A * | 1/1999 | Saringer et al. | ................. | 601/33 |
| 6,012,355 A * | 1/2000 | Sudau | ......................... | 74/574.3 |
| 6,162,152 A * | 12/2000 | Kuo | ............................... | 482/63 |
| 6,318,522 B1 * | 11/2001 | Johnston et al. | ........... | 188/267.2 |
| 7,385,324 B2 * | 6/2008 | Lin | ................................. | 310/74 |

* cited by examiner

*Primary Examiner* — Vicky Johnson

(57) ABSTRACT

A flywheel assembly includes a flywheel rotatably mounted on an exercise and a magnetic control device is centrally received in the flywheel for providing damping to the flywheel. The magnetic control device includes two discs abutted each other. Each disc has a wiggle seat rotatable mounted thereon and each wiggle seat is formed with a sector shoe. Each sector has multiple magnets peripherally secured thereon such that the damping acted on the flywheel is adjusted due to the magnets when the two wiggle seats are synchronously wiggled relative to a corresponding one of the two discs.

12 Claims, 7 Drawing Sheets

FLYWHEEL ASSEMBLY FOR EXERCISE DEVICES

BACKGROUND OF THE INVENTION

1. Field of the Invention

The present invention relates to a flywheel assembly, and more particularly to a flywheel assembly that provides damping to an exercise device and the damping can be smoothly adjusted due to magnets.

2. Description of Related Art

Nowadays, there are more and more peoples can not set aside a little time to take exercise outdoors such that many types exercise device, such as an exercise bike, are marketed for these peoples who are busy but want to take exercise indoors. For promoting the load of the exercise devices, a flywheel assembly is rotatably mounted in the exercises devices for providing damping during being operated.

A conventional flywheel assembly comprises a flywheel rotatably mounted on the exercise and a stator stably and co-axially received in the flywheel, wherein the stator can be co-axially reciprocally relative to the flywheel. The stator has multiple magnets peripherally mounted thereon for providing damping to the flywheel due to magnetic force. Consequently, the damping has a maximum value when the stator is fully received in the flywheel and the damping is gradually reduced when the stator is gradually moved away from the flywheel along an axis of the flywheel assembly.

The conventional flywheel assembly is hard to adjust/reduce the damping when the damping is in a maximum value because the operator needs to overcome the magnetic force before drawing the stator. In addition, the stator is moved along the axis of the flywheel such that the exercise device needs to provide an enlarged space for receiving the conventional flywheel. As a result, the volume of the exercise device with the conventional flywheel assembly is enlarged, accordingly.

The present invention has arisen to mitigate and/or obviate the disadvantages of the conventional flywheel assembly.

SUMMARY OF THE INVENTION

The main objective of the present invention is to provide an improved flywheel assembly that provides damping to an exercise device and the damping is adjustable due to magnets.

To achieve the objective, the flywheel assembly in accordance with the present invention comprises a flywheel rotatably mounted on an exercise device and having a trough centrally defined therein. A magnetic control device is received in the trough for providing damping to the flywheel, wherein the flywheel is rotatable relative to the magnetic control device. The magnetic control device includes a first disc and a second disc securely mounted to each other. The first disc and the second disc respectively have a first protrusion and a second protrusion eccentrically and inwardly extending from the first disc and the second disc. The first protrusion and the second protrusion respectively have a center, wherein the two centers and a center of the flywheel are collinear. A slot is defined in the second disc and a first curved cavity defined in an interior of the second disc for partially receiving a resilient member. A first stopper extends from one end of a bottom of the first curved cavity for abutting a first end of the resilient member. A first wiggle seat and a second wiggle seat are respectively laterally and rotatably mounted on the first protrusion and the second protrusion, wherein the two wiggle seats are synchronously wiggled when being operated. Each wiggle seat has a through hole defined therein for pivotally receiving a corresponding one of the first protrusion and the second protrusion. The first wiggle seat and the second wiggle seat are respectively formed with a first sector shoe and a second sector shoe, wherein each sector shoe includes a periphery having multiple magnets securely thereon for providing damping to the flywheel. A second curved cavity is defined in the second sector shoe and communicating with the first curved cavity for receiving the resilient member. A second stopper extends from one end of a bottom of the second curved cavity for abutting against a second end of the resilient member. An axle unit centrally extends through the flywheel and the magnetic control device for positioning the flywheel and the magnetic control device on the exercise device, wherein one end of the axle unit is securely connected to the second disc such that the flywheel is rotatable relative to the magnetic control device. A cable has a first end secured on the first disc and a second end adapted to be connected to a lever for user to operate the magnetic control device and adjust the damping that is acted on the flywheel.

Accordingly, the flywheel assembly in accordance with the present invention includes several advantages as follow.

1. The first wiggle seat and the second wiggle seat are synchronously and steplessly moved relative to the flywheel for adjusting the damping acted on the flywheel such that the load of the exercise device can be smoothly, accurately and averagely adjusted.

2. The first sector shoe/the second sector shoe is wiggled away from the magnetic ring along a curve relative to the first protrusion/the second protrusion such that the inducting area is reducer and the magnetic control device in accordance with the present invention provides a labor-saving operation.

3. The magnetic control device in accordance with the present invention only needs a resilient member to push the first wiggle seat and the second wiggle seat to their original position such that the structures of the present invention are simplified.

Further benefits and advantages of the present invention will become apparent after a careful reading of the detailed description with appropriate reference to the accompanying drawings.

DETAILED DESCRIPTION OF THE INVENTION

Figure 1:
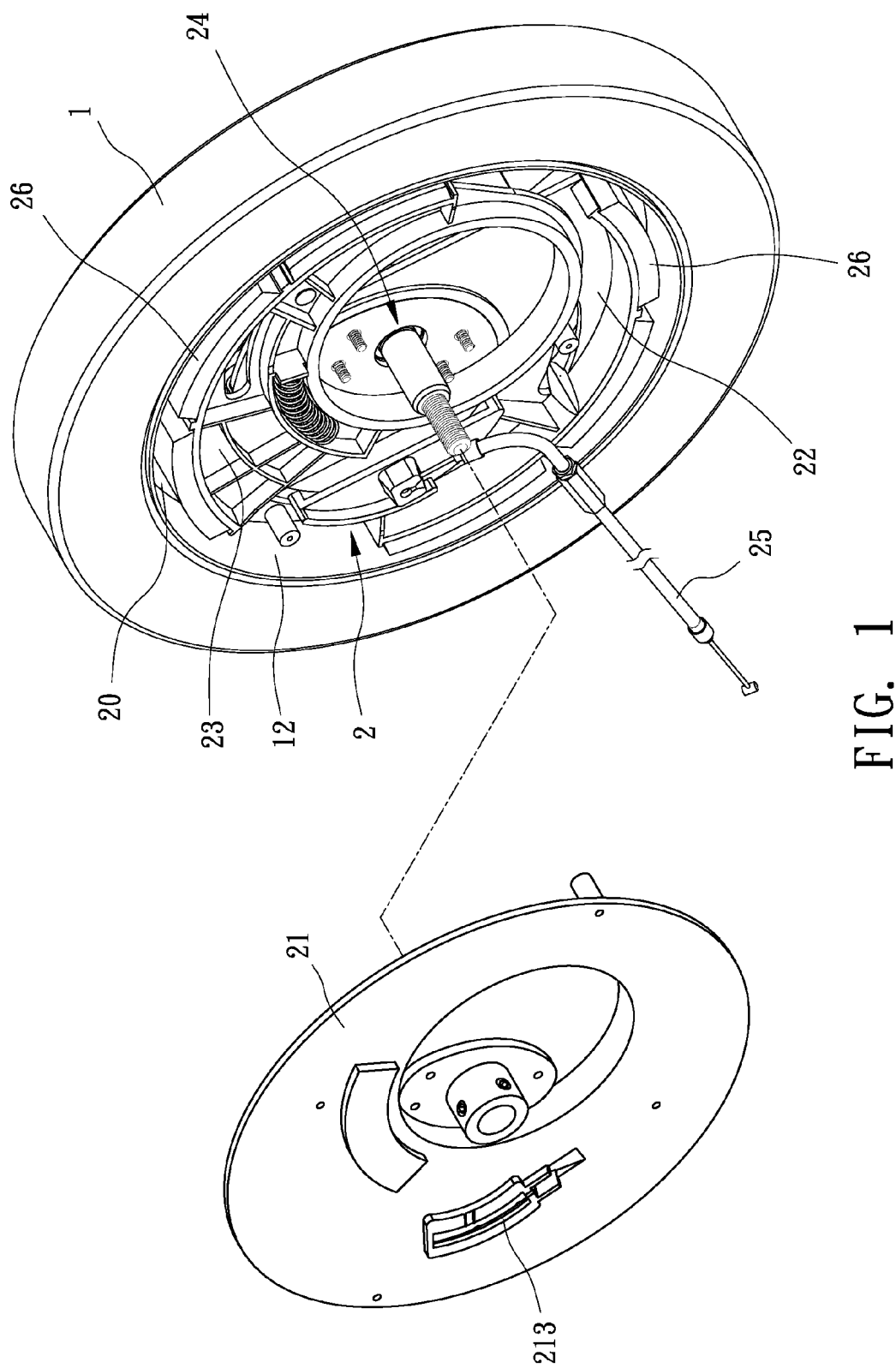
FIG. 1 is a partially exploded perspective view of a flywheel assembly for exercise devices in accordance with the present invention.
Figure 2:
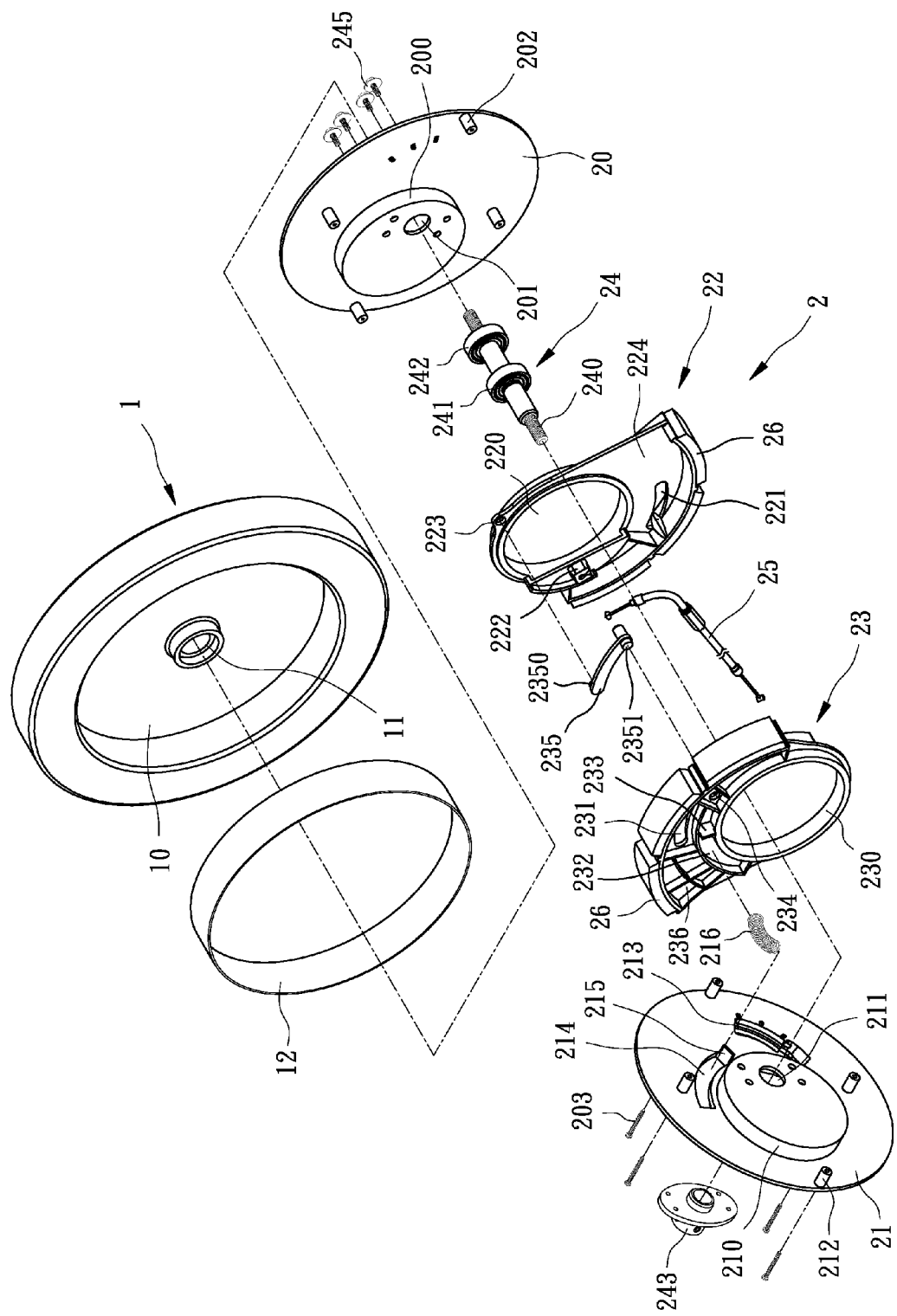
FIG. 2 is an exploded perspective view of the flywheel assembly in accordance with the present invention.
Figure 3:
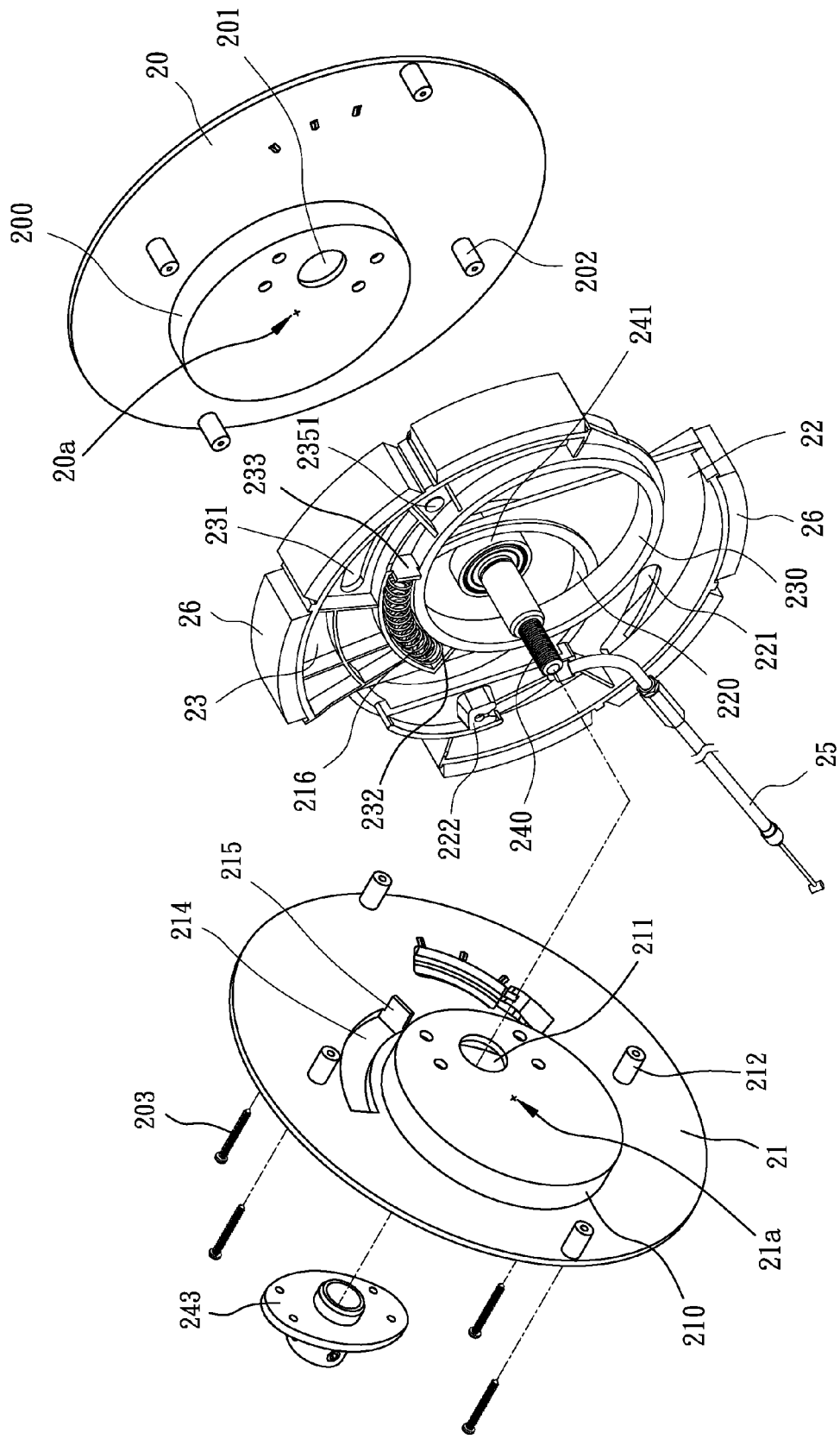
FIG. 3 is a partially exploded perspective view of a magnetic control device in accordance with the present invention.
Figure 4:
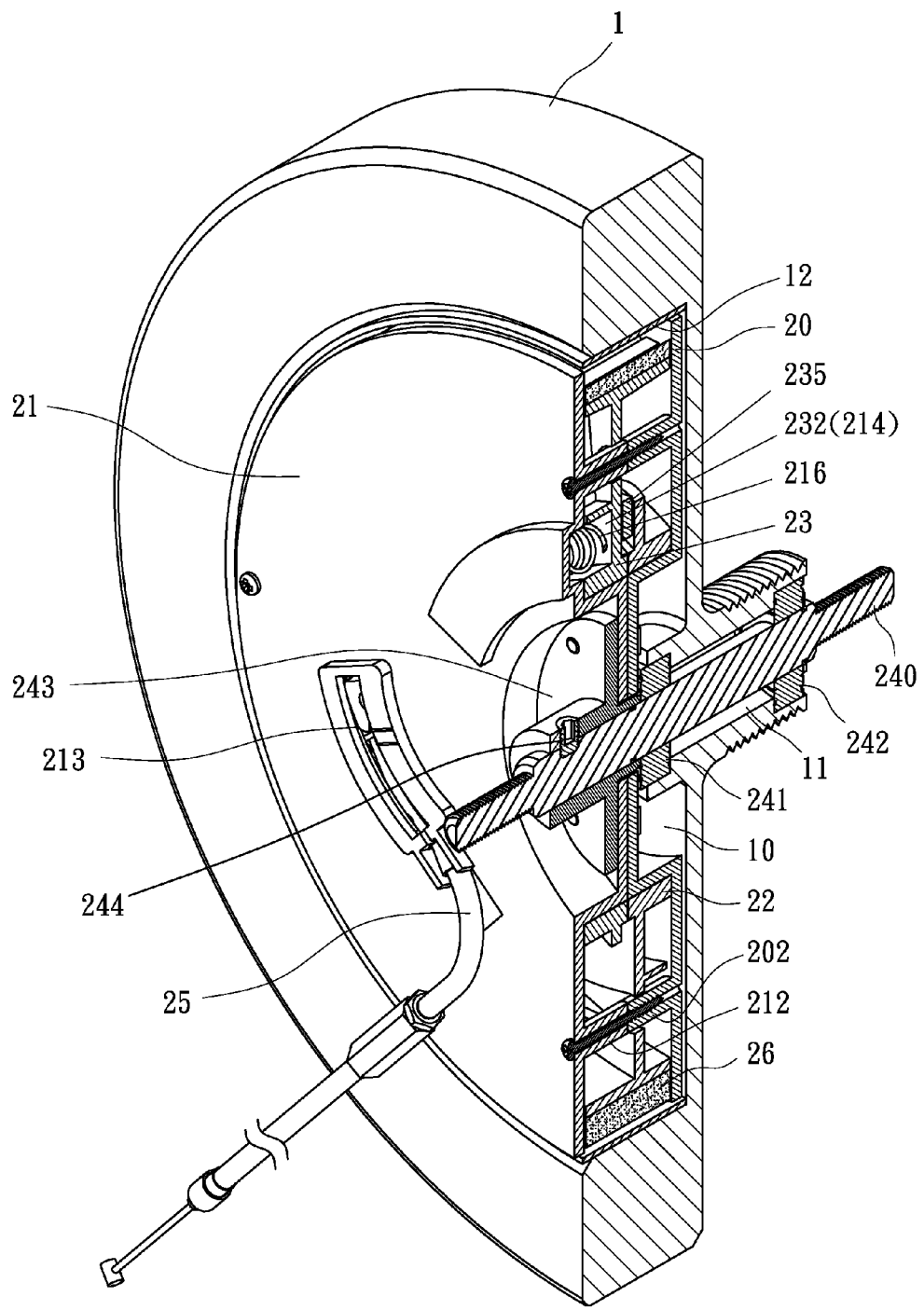
FIG. 4 is a perspective cross-sectional view of the flywheel assembly in accordance with the present invention.

Referring to the drawings and initially to FIGS. 1-4, a flywheel assembly for exercise devices in accordance with the present invention comprises a flywheel (1) and a magnetic control device (2) concentrically received in the flywheel (1), wherein the flywheel (1) is rotatable relative to the magnetic control device (2). The magnetic control device (2) includes a first disc (20) and a second disc (21) securely mounted to each other. The first disc (20) and the second disc (21) respectively have a first wiggle seat (22) and a second wiggle seat (23) eccentrically and rotatably mounted thereon. The first wiggle seat (22) and the second wiggle seat (23) are synchronously operated and wiggled relative to the first disc (20) and the second disc (21). The wiggle directions of the first wiggle seat (22) and the second wiggle seat (23) are opposite to each other. An axle unit (24) centrally extends through the flywheel (1) and the magnetic control device (2) for positioning the first disc (20) and the second disc (21). A cable (25) has one end fixed on the second wiggle seat (23) for user to synchronously operate the two wiggle seats (22, 23).

The flywheel (1) is made of magnetic induct material and includes a trough (10) centrally defined therein for receiving the magnetic control device (2). A magnetic ring (12) is secured on a periphery of the trough (10) for promoting the magnetic inducting effect between the flywheel (1) and the magnetic control device (2). A hole (11) is centrally defined in a bottom of the trough (10).

Each of the first disc (20) and the second disc (21) respectively includes a first protrusion (200) and the second protrusion (210) eccentrically and inwardly extending therefrom for pivotally mounting the first wiggle seat (22) and the second wiggle seat (23). The first protrusion (200) and the second protrusion (210) respectively have a center (20a, 21a), wherein the two centers (20a, 21a) and a center (1a) of the flywheel (1) are collinear. The first disc (20) has a first through hole (201) centrally defined therein and the second disc (21) has a second through hole (211) centrally defined therein to allow the axle unit (24) extending through the magnetic control device (2). The first disc (20) has multiple first stubs (202) laterally extending therefrom toward the second disc (21) and the second disc (21) has multiple second stubs (212) laterally extending therefrom toward the first disc (20). Each first stub (202) linearly aligns with a corresponding one of the second stubs (212) and a locking member (203) extends through the aligned first stub (202) and the second stub (212) for combining the first disc (20) and the second disc (21). The second disc (21) has a slot (213) defined therein, wherein the cable (25) extends through the magnetic control device (2) via the slot (213) and is connected to a lever (not shown) for user to adjust the damping between the magnetic control device (2) and the flywheel (1). A first curved cavity (214) is defined in an interior of the second disc (21) and concentrically corresponds to the second protrusion (210) for partially receiving a resilient member (216). A first stopper (215) extends from one end of a bottom of the first curved cavity (214) for abutting against a first end of the resilient member (216). In the preferred embodiment of the present invention, the resilient member (216) is a spring and compressively received in the first curved cavity (214).

Figure 5:
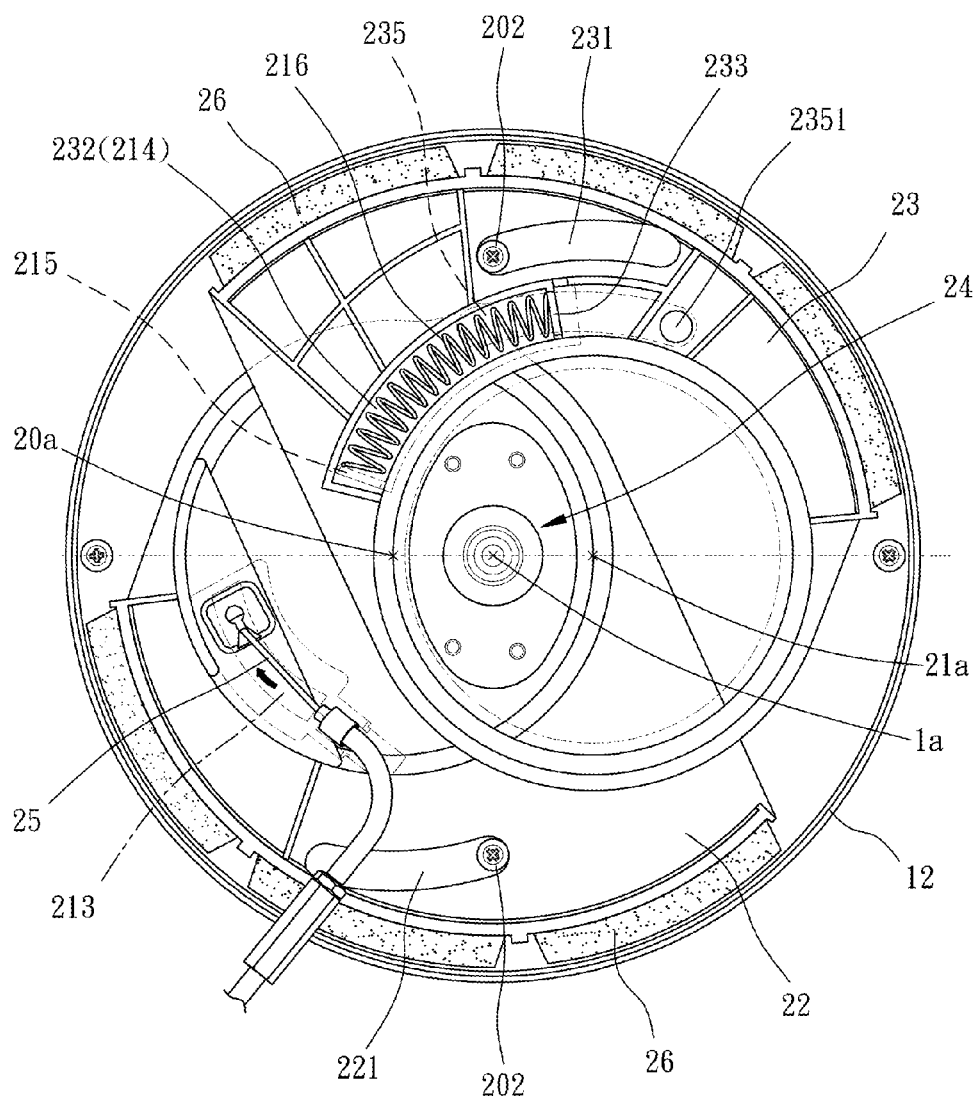
FIG. 5 is a side operational view of the magnetic control device when providing a maximum damping.
Figure 6:
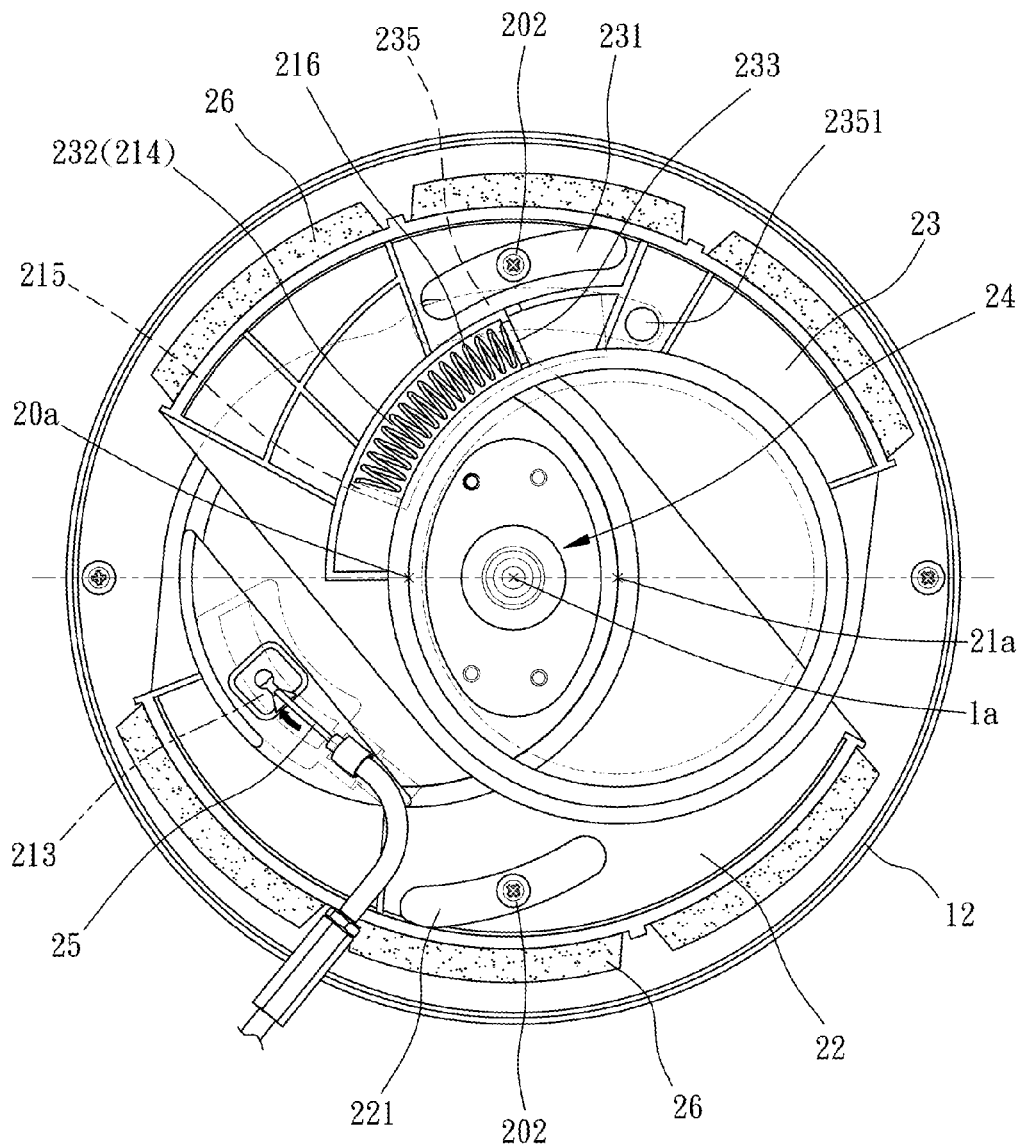
FIG. 6 is a side operational view of the magnetic control device when the damping is reduced.
Figure 7:
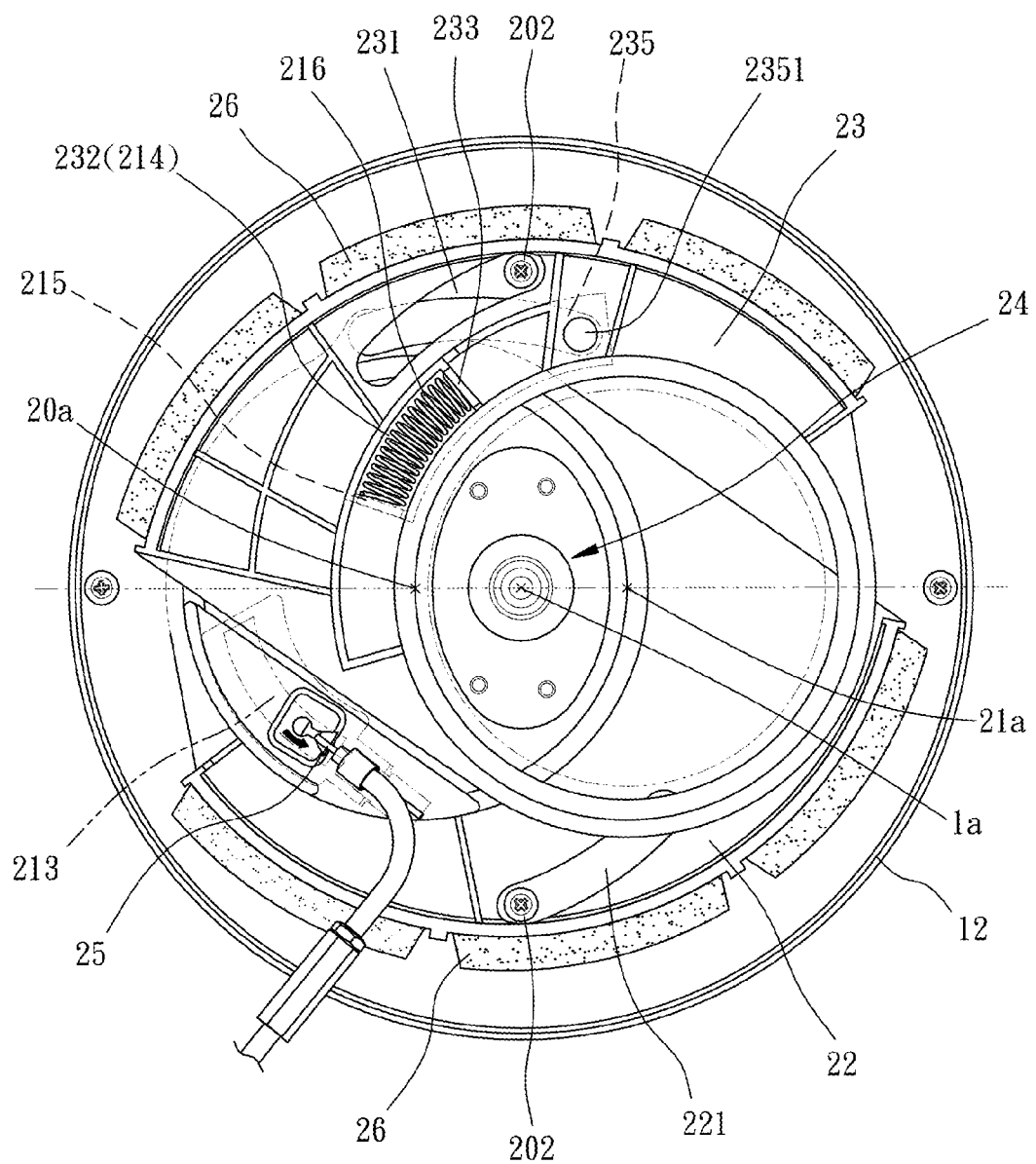
FIG. 7 is a side operational view of the magnetic control device when providing a minimum damping.

In the preferred embodiment of the present invention, the outline of the first wiggle seat (22) is the same as that of the second wiggle seat (23). The first wiggle seat (22) and the second wiggle seat (23) respectively have a first hole (220) and a second hole (230) defined therein. The first protrusion (200) and the second protrusion (210) are respectively and rotatably received in the first hole (220) and the second hole (230) such that the first wiggle seat (22) can be freely and pivotally moved relative to the first protrusion (200) and the second wiggle seat (23) can be freely and pivotally moved relative to the second protrusion (210). The first wiggle seat (22) and the second wiggle seat (23) are respectively formed with a first sector shoe (224) and a second sector shoe (236) respectively having a curvature corresponding to that of the flywheel (1). The first sector shoe (224) and the second sector shoe (236) are opposite to each other and respectively have a virtual apex situated on an axis of the flywheel (1) when the two sector shoes (224, 236) concentrically correspond to the flywheel (1) and provide a maximum damping, as shown in FIG. 5. A first curved groove (221) is defined in the first sector shoe (224) to allow a corresponding one of the first stubs (202) extending through the first curved groove (221). A second curved groove (231) is defined in the second sector shoe (236) to allow a corresponding one of the second stubs (212) extending through the second sector shoe (236), wherein the first curved groove (221) and the second curved groove (231) correspond to each other and respectively limit a wiggle range of the two wiggle seats (22, 23). Each sector shoe (224, 236) includes a curved periphery having a series of magnets (26) secured thereon for providing damping to the flywheel (1). The first wiggle seat (22) has a connector (222) extending from an interior thereof for positioning the distal end o the cable (25). A second curved cavity (232) is defined in one side of the second sector shoe (236) and completely communicates with the first curved cavity (214) for receiving the resilient member (216). A second stopper (233) laterally extends from the second sector shoe (236) and abuts against a second end of the resilient member (216) such that the resilient member (216) is compressed due to the two stoppers (215, 233) when the second wiggle seat (23) is operated.

The magnetic control device (2) includes a linkage (235) disposed between the first wiggle seat (22) and the second wiggle seat (23). A first latch (2350) and a second latch (2351) respectively vertically extend from two opposite sides of the linkage (235), wherein the first latch (2350) and the second latch (2351) are opposite to each other. A first pivot hole (223) is defined in the first wiggle seat (22) beside the first hole (220) and a second pivot hole (234) defined in the second sector shoe (236) beside the second hole (230). The first latch (2350) and the second latch (2351) are respectively pivotally received in the first pivot hole (223) and the second pivot hole (234) such that the first wiggle seat (22) and the second wiggle seat (23) are synchronously wiggled due to the linkage (235).

The axle unit (24) includes a shaft (240) sequentially extending through the hole (11), the first through hole (201) and the second through hole (211). A first bearing (241) and a second bearing (242) are securely sleeved on the shaft (240), wherein the first bearing (241) and the second bearing (242) are securely received in two opposite ends of the hole in the flywheel (1). A coupling (243) is laterally mounted to an exterior of the second disc (21) by locking members (245) and concentrically corresponds to the second through hole (211). The shaft (240) extends through the coupling (243). A lock pin (244) radially extends into the coupling (243) and securely inserted into the shaft (240) for connecting the axle unit (24) and the magnetic control device (2).

With reference to FIG. 5, the first sector shoe (224) and the second sector (236) diametrically correspond to each other relative to the flywheel (1) when the cable (25) is released and the resilient member (216) extends to a maximum. At the same time, the magnetic control device (2) provides a maximum damping to the flywheel (1). With reference 6 and 7, the first wiggle seat (22) is gradually wiggled relative to the first disc (20) and the second wiggle seat (23) is synchronously wiggled to compress the resilient member (216) when the cable (25) is pulled the tension of the cable (25) is gradually raised. At the same time, the first sector shoe (224) and the second sector shoe (236) are gradually far away from the magnetic ring (12) such that the damping from the magnetic control device (2) is gradually reduced and can be steplessly adjusted.

As described above, the flywheel assembly in accordance with the present invention includes several advantages as follow.

1. The first wiggle seat (22) and the second wiggle seat (23) are synchronously and steplessly moved relative to the flywheel (1) for adjusting the damping acted on the flywheel (1) such that the load of the exercise device can be smoothly, accurately and averagely adjusted.

2. The first sector shoe (224)/the second sector shoe (236) is wiggled away from the magnetic ring (12) along a curve relative to the first protrusion (200)/the second protrusion (210) such that the inducting area is reducer and the magnetic control device (2) in accordance with the present invention provides a labor-saving operation.

3. The magnetic control device (2) in accordance with the present invention only needs a resilient member (216) to push the first wiggle seat (22) and the second wiggle seat (23) to their original position such that the structures of the present invention are simplified.

Although the invention has been explained in relation to its preferred embodiment, it is to be understood that many other possible modifications and variations can be made without departing from the spirit and scope of the invention as hereinafter claimed.

What is claimed is:

1. A flywheel assembly for exercise devices, comprising:
a flywheel adapted to be rotatably mounted on an exercise device and having a trough centrally defined therein;
a magnetic control device received in the trough for providing damping to the flywheel, wherein the flywheel is rotatable relative to the magnetic control device, the magnetic control device including:
a first disc and a second disc securely mounted to each other, the first disc and the second disc respectively having a first protrusion and a second protrusion eccentrically and inwardly extending from the first disc and the second disc, the first protrusion and the second protrusion respectively having a center, wherein the two centers and a center of the flywheel are collinear, a slot defined in the second disc and a first curved cavity defined in an interior of the second disc for partially receiving a resilient member, a first stopper extending from one end of a bottom of the first curved cavity for abutting a first end of the resilient member; and
a first wiggle seat and a second wiggle seat respectively laterally and rotatably mounted on the first protrusion and the second protrusion, wherein the first wiggle seat and the second wiggle seat are synchronously pivotally moved relative to the first protrusion and the second protrusion when being operated, each wiggle seat having a through hole defined therein such that the first protrusion is pivotally received in the through hole in the first wiggle seat and the second protrusion is pivotally received in the through hole in the second wiggle seat, the first wiggle seat and the second wiggle seat respectively formed with a first sector shoe and a second sector shoe, wherein each sector shoe includes a periphery having multiple magnets secured thereon for providing damping to the flywheel, a second curved cavity defined in the second sector shoe and communicating with the first curved cavity for receiving the resilient member, a second stopper extending from one end of a bottom of the second curved cavity for abutting against a second end of the resilient member;
an axle unit centrally extending through the flywheel and the magnetic control device for positioning the flywheel and the magnetic control device on the exercise device, wherein one end of the axle unit is securely connected to the second disc such that the flywheel is rotatable relative to the magnetic control device; and
a cable having a first end secured on the first disc and a second end adapted to be connected to a lever for user to operate the magnetic control device and adjust the damping that is acted on the flywheel.

2. The flywheel assembly as claimed in claim 1, wherein the flywheel includes a magnetic ring secured on a periphery of the trough for promoting the magnetic inducting effect between the flywheel and the magnetic control device.

3. The flywheel assembly as claimed in claim 2, wherein the magnetic device includes a linkage disposed between the first wiggle seat and the second wiggle seat, a first latch and a second latch respectively vertically extending from two opposite sides of the linkage, wherein the first latch and the second latch are opposite to each other, a first pivot hole defined in the first wiggle beside the first hole in the first wiggle seat and a second pivot hole defined in the second sector shoe beside the second hole in the second wiggle seat, the first latch and the second latch respectively pivotally received in the first pivot hole and the second pivot hole such that the first wiggle seat and the second wiggle are synchronously rotated due to the linkage.

4. The flywheel assembly as claimed in claim 3, wherein the flywheel includes a hole centrally defined in a bottom of the trough and the axle unit includes a shaft sequentially extending through the hole, the first through hole and the second through hole, a first bearing and a second bearing respectively securely sleeved on the shaft, wherein the first bearing and the second bearing are secured received in two opposite ends of the hole in the flywheel.

5. The flywheel assembly as claimed in claim 4, wherein the magnetic control device includes a coupling laterally and concentrically mounted to an exterior of the second disc by locking members, the shaft extending through the coupling, a lock pin radially extending into the coupling and securely inserted into the shaft for connecting the axle unit and the magnetic control device.

6. The flywheel assembly as claimed in claim 2, wherein the flywheel includes a hole centrally defined in a bottom of the trough and the axle unit includes a shaft sequentially extending through the hole, the first through hole and the second through hole, a first bearing and a second bearing respectively securely sleeved on the shaft, wherein the first bearing and the second bearing are secured received in two opposite ends of the hole in the flywheel.

7. The flywheel assembly as claimed in claim 6, wherein the magnetic control device includes a coupling laterally and concentrically mounted to an exterior of the second disc by locking members, the shaft extending through the coupling, a lock pin radially extending into the coupling and securely inserted into the shaft for connecting the axle unit and the magnetic control device.

8. The flywheel assembly as claimed in claim 1, wherein the magnetic device includes a linkage disposed between the first wiggle seat and the second wiggle seat, a first latch and a second latch respectively vertically extending from two opposite sides of the linkage, wherein the first latch and the second latch are opposite to each other, a first pivot hole defined in the first wiggle beside the first hole in the first wiggle seat and a second pivot hole defined in the second sector shoe beside the second hole in the second wiggle seat, the first latch and the second latch respectively pivotally received in the first pivot hole and the second pivot hole such that the first wiggle seat and the second wiggle are synchronously rotated due to the linkage.

9. The flywheel assembly as claimed in claim 8, wherein the flywheel includes a hole centrally defined in a bottom of the trough and the axle unit includes a shaft sequentially extending through the hole, the first through hole and the second through hole, a first bearing and a second bearing respectively securely sleeved on the shaft, wherein the first bearing and the second bearing are secured received in two opposite ends of the hole in the flywheel.

10. The flywheel assembly as claimed in claim 9, wherein the magnetic control device includes a coupling laterally and concentrically mounted to an exterior of the second disc by locking members, the shaft extending through the coupling, a lock pin radially extending into the coupling and securely inserted into the shaft for connecting the axle unit and the magnetic control device.

11. The flywheel assembly as claimed in claim 1, wherein the flywheel includes a hole centrally defined in a bottom of the trough and the axle unit includes a shaft sequentially extending through the hole, the first through hole and the second through hole, a first bearing and a second bearing respectively securely sleeved on the shaft, wherein the first bearing and the second bearing are secured received in two opposite ends of the hole in the flywheel.

12. The flywheel assembly as claimed in claim 11, wherein the magnetic control device includes a coupling laterally and concentrically mounted to an exterior of the second disc by locking members, the shaft extending through the coupling, a lock pin radially extending into the coupling and securely inserted into the shaft for connecting the axle unit and the magnetic control device.

* * * * *